(12) United States Patent
Hoshino et al.

(10) Patent No.: US 10,392,719 B2
(45) Date of Patent: Aug. 27, 2019

(54) ELECTROLYTIC TREATMENT APPARATUS AND ELECTROLYTIC TREATMENT METHOD

(71) Applicant: TOKYO ELECTRON LIMITED, Tokyo (JP)

(72) Inventors: Tomohisa Hoshino, Kumamoto (JP); Masato Hamada, Kumamoto (JP)

(73) Assignee: Tokyo Electron Limited, Tokyo (JP)

( * ) Notice: Subject to any disclaimer, the term of this patent is extended or adjusted under 35 U.S.C. 154(b) by 243 days.

(21) Appl. No.: 15/362,159

(22) Filed: Nov. 28, 2016

(65) Prior Publication Data

US 2017/0159202 A1 Jun. 8, 2017

(30) Foreign Application Priority Data

Dec. 3, 2015 (JP) .................. 2015-236351

(51) Int. Cl.
| | | |
|---|---|---|
| C25D 21/00 | (2006.01) | |
| C25D 17/00 | (2006.01) | |
| H02J 7/00 | (2006.01) | |
| C25D 5/18 | (2006.01) | |
| C25D 17/10 | (2006.01) | |
| C25D 21/12 | (2006.01) | |
| C25D 3/38 | (2006.01) | |
| H02J 7/34 | (2006.01) | |

(52) U.S. Cl.
CPC .............. *C25D 17/007* (2013.01); *C25D 5/18* (2013.01); *C25D 17/00* (2013.01); *C25D 17/10* (2013.01); *C25D 21/12* (2013.01); *H02J 7/0063* (2013.01); *C25D 3/38* (2013.01); *H02J 7/345* (2013.01); *H02J 2007/0067* (2013.01)

(58) Field of Classification Search
CPC ........ C25D 21/12; C25D 17/00; C25D 17/10; C25D 5/18
USPC ...................................................... 204/230.5
See application file for complete search history.

(56) References Cited

FOREIGN PATENT DOCUMENTS

| JP | 2015-004124 A | 1/2015 |
| WO | 2015/104951 A | 7/2015 |

*Primary Examiner* — Zulmariam Mendez
(74) *Attorney, Agent, or Firm* — Abelman, Frayne & Schwab

(57) ABSTRACT

An electrolytic treatment apparatus of the present disclosure includes a common electrode and a counter electrode that are disposed such that the treatment liquid is interposed therebetween. A first wiring and a second wiring are connected to the common electrode, a capacitor is provided in the first wiring. Copper ions are moved to the counter electrode side by forming an electric field in the treatment liquid when the capacitor is charged without connecting the first wiring and the second wiring to each other, and the copper ions moved to the counter electrode side are reduced by applying a voltage between the common electrode and the counter electrode when the capacitor is discharged by connecting the first wiring and the second wiring to each other.

10 Claims, 7 Drawing Sheets

470pF

220pF

110pF

ELECTROLYTIC TREATMENT APPARATUS AND ELECTROLYTIC TREATMENT METHOD

CROSS-REFERENCE TO RELATED APPLICATIONS

This application is based on and claims priority from Japanese Patent Application No. 2015-236351 filed on Dec. 3, 2015, with the Japan Patent Office, the disclosure of which is incorporated herein in its entirety by reference.

TECHNICAL FIELD

The present disclosure relates to an electrolytic treatment apparatus for performing a predetermined treatment by using treatment target ions contained in a treatment liquid, and an electrolytic treatment method using the electrolytic treatment apparatus.

BACKGROUND

An electrolytic process (electrolytic treatment) is a technique used for various treatments such as a plating treatment and an etching treatment.

In order to uniformly perform the plating treatment, for example, the plating treatment disclosed in Japanese Laid-Open Patent Publication No. 2015-004124 has been suggested. In the plating treatment, a direct electrode and a counter electrode (a workpiece) are disposed such that a plating liquid is interposed therebetween, and an indirect electrode is disposed to form an electric field in the plating liquid. Then, metal ions in the plating liquid are moved to the counter electrode side by the electric field formed using the indirect electrode, and a voltage is applied between the direct electrode and the counter electrode so as to reduce the metal ions moved to the counter electrode side.

In this case, since the movement of the metal ions by the indirect electrode and the reduction of the metal ions by the direct electrode and the counter electrode are individually performed, the reduction of the metal ions may be performed in a state where the metal ions are uniformly integrated on the counter electrode side, and as a result, the uniformization of the plating treatment is implemented.

SUMMARY

The present disclosure provides an electrolytic treatment apparatus for performing a predetermined treatment by using treatment target ions contained in a treatment liquid. The electrolytic treatment apparatus includes a common electrode and a counter electrode that are disposed such that the treatment liquid is interposed therebetween. A first wiring and a second wiring are connected to the common electrode, and a capacitor is provided in the first wiring. When charging of the capacitor is performed in a state where the first wiring and the second wiring are not connected to each other, the common electrode forms an electric field in the treatment liquid so that the treatment target ions in the treatment liquid are moved to the counter electrode side, and when discharging is performed in a state where the first wiring and the second wiring are connected to each other, a voltage is applied between the common electrode and the counter electrode so that the treatment target ions moved to the counter electrode side are oxidized or reduced.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9A represents a variation of a voltage when a capacity of a capacitor is 470 pF, FIG. 9B represents a variation of a voltage when the capacity of the capacitor is 220 pF, and FIG. 9C represents a variation of a voltage when the capacity of the capacitor is 110 pF.

DETAILED DESCRIPTION

Figure 1:
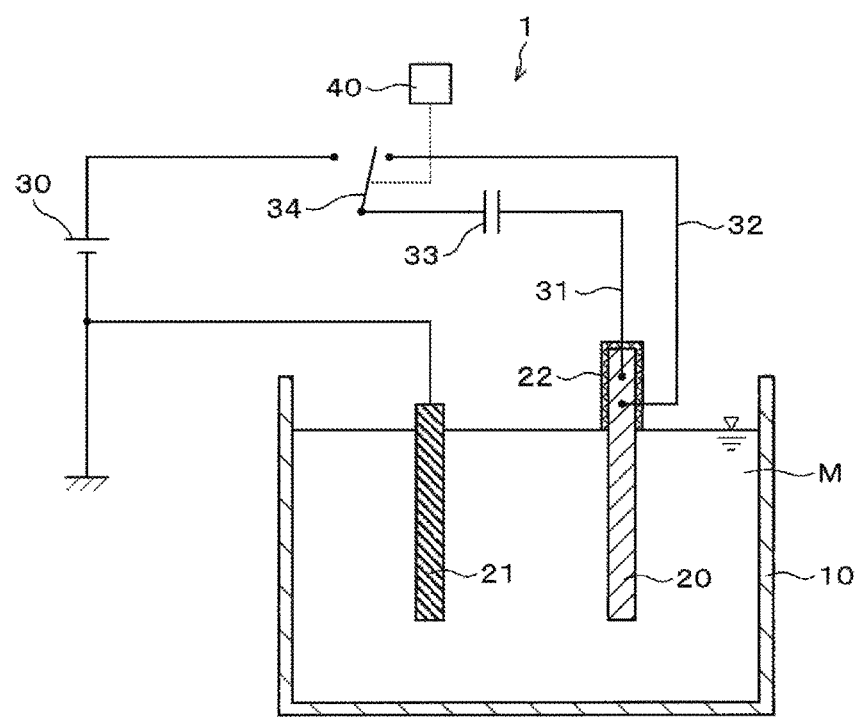
FIG. 1 is an explanatory view illustrating an outline of a plating treatment apparatus according to an exemplary embodiment.

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

As a result of intensive study by the inventors of the present disclosure, it has been found that, in the plating treatment disclosed in Japanese Laid-Open Patent Publication No. 2015-004124, a degree of freedom of design is low since the surface area of the indirect electrode immersed in the plating liquid is required to be large in order to increase a growth rate of the plating in view of the structure. Further, it has been found that there is case where the concentration of the metal ions integrated on the counter electrode side is low, and in this case, it is required to improve the growth rate of the plating and the coating performances such as, for example, the film thickness and quality in the plating.

The present disclosure has been made in view of the foregoing circumstances, and an object thereof is to effectively and appropriately perform a predetermined treatment on a workpiece by using treatment target ions in a treatment liquid.

In order to achieve the above-described object, the present disclosure provides an electrolytic treatment apparatus for performing a predetermined treatment by using treatment target ions contained in a treatment liquid. The electrolytic treatment apparatus includes a common electrode and a counter electrode that are disposed such that the treatment liquid is interposed therebetween. A first wiring and a second wiring are connected to the common electrode, and a capacitor is provided in the first wiring. When charging of the capacitor is performed in a state where the first wiring and the second wiring are not connected to each other, the common electrode forms an electric field in the treatment liquid so that the treatment target ions in the treatment liquid are moved to the counter electrode side, and when discharging is performed in a state where the first wiring and the second wiring are connected to each other, a voltage is applied between the common electrode and the counter electrode so that the treatment target ions moved to the counter electrode side are oxidized or reduced.

For example, in a case where the treatment target ions are cations, when the charging of the capacitor is performed to form an electric field (electrostatic field) in the treatment liquid, negatively charged particles are gathered to the common electrode side, and the treatment target ions are moved to the counter electrode side. Then, the discharging of the capacitor is performed, and a voltage is applied in a state where the common electrode is an anode, and the counter electrode is a cathode such that currents are caused to flow between the common electrode and the counter electrode. Then, the charges of the treatment target ions moved to the counter electrode side are exchanged, and the treatment target ions are reduced.

Likewise, for example, in a case where the treatment target ions are anions, when the charging of the capacitor is performed to form an electric field in the treatment liquid, the treatment target ions are moved to the counter electrode side. Then, the discharging of the capacitor is performed, and a voltage is applied in a state where the common electrode is a cathode, and the counter electrode is an anode such that currents are caused to flow between the common electrode and the counter electrode. Then, the charges of the treatment target ions moved to the counter electrode side are exchanged, and the treatment target ions are oxidized.

As described above, in the present disclosure, the movement of the treatment target ions by the charging of the capacitor and the oxidization or the reduction (hereinafter, sometimes simply referred to as "redox") of the treatment target ions by the discharging of the capacitor are individually performed. In addition, the concentration of the treatment target ions to be integrated on the counter electrode side may be controlled by adjusting the capacity of the capacitor. For example, when the concentration of the treatment target ions is controlled to be high, the redox of the treatment target ions may be performed in a state where sufficient treatment target ions are integrated on the surface of the counter electrode, and as a result, a rate of the electrolytic treatment may be improved. Further, since the redox of the treatment target ions is performed in a state where the treatment target ions are uniformly arranged on the surface of the counter electrode, the uniformity of the electrolytic treatment may also be improved.

The electrolytic treatment apparatus may further include a switch that switches a connection or a disconnection between the first wiring and the second wiring.

In the first wiring, a plurality of capacitors may be provided in parallel.

The capacitor may be provided outside the treatment liquid.

In view of another aspect, the present disclosure provides an electrolytic treatment method for performing a predetermined treatment by using treatment target ions contained in a treatment liquid. The method includes a first process of disposing a common electrode and a counter electrode such that the treatment liquid is interposed therebetween, connecting a first wiring and a second wiring to the common electrode, and providing a capacitor in the first wiring; a second process of performing charging of the capacitor without connecting the first wiring and the second wiring to each other to form an electric field in the treatment liquid such that the treatment target ions in the treatment liquid are moved to the counter electrode side; and a third process of performing discharging of the capacitor in a state where the first wiring and the second wiring are connected to each other to apply a voltage between the common electrode and the counter electrode such that the treatment target ions moved to the counter electrode side are oxidized or reduced.

The disconnection between the first wiring and the second wiring in the second process and the connection between the first wiring and the second wiring in the third process may be switched by a switch.

In the first process, a plurality of capacitors may be provided in parallel in the first wiring.

In the first process, the capacitor may be provided outside the treatment liquid.

According to the present disclosure, a predetermined treatment on a workpiece may be effectively or appropriately performed by using the treatment target ions in the treatment liquid.

Hereinafter, an exemplary embodiment of the present disclosure will be described. In the exemplary embodiment, descriptions will be made with reference to a case where a plating treatment is performed as an electrolytic treatment according to the present disclosure. FIG. 1 is a vertical sectional view illustrating an outline of a plating treatment apparatus 1 as an electrolytic treatment apparatus according to an exemplary embodiment. In the drawings used for the following descriptions, the dimension of each component is first intended to facilitate the understanding of the technology, and hence, may not correspond to the actual dimension.

The plating treatment apparatus 1 includes a plating tank 10 that stores therein a plating liquid M as a treatment liquid. As the plating liquid M, for example, a liquid mixture obtained by dissolving copper sulfate and sulfuric acid together is used. The plating liquid M contains copper ions as treatment target ions.

A common electrode 20 and a counter electrode 21 are disposed in a state of being immersed in the plating tank 10. A portion of the common electrode 20 which is exposed to the atmosphere is coated with an insulating material 22 such as, for example, a UV curing resin. In addition, for example, when a circuit in the plating treatment apparatus 1 is an electric equivalent circuit, the insulating material 22 may be omitted.

The counter electrode 21 is disposed opposite to the common electrode 20 with the plating liquid M being interposed therebetween. In the present exemplary embodiment, the counter electrode 21 is a workpiece to be subject to the plating treatment.

A DC power supply 30 is connected to the common electrode 20 and the counter electrode 21. The common electrode 20 is connected to the positive electrode side of the DC power supply 30. The counter electrode 21 is connected to the negative electrode side of the DC power supply 30.

A first wiring 31 and a second wiring 32 are connected to the common electrode 20, and a capacitor 33 is provided in the first wiring 31. In addition, a switch 34 is provided in the first wiring 31. The switch 34 switches the connection between the first wiring 31 and the DC power supply 30, and the connection between the first wiring 31 and the second wiring 32. The switching by the switch 34 is controlled by a controller 40.

The above-described plating treatment apparatus 1 is provided with the controller 40. The controller 40 is, for example, a computer and has a program storage unit (not illustrated). The program storage unit stores a program for controlling the plating treatment in the plating treatment apparatus 1. The program may be recorded in, for example, a computer readable recording medium such as, for example, a computer readable hard disc (HD), a flexible disc (FD), a compact disc (CD), a magnet optical disc (MO), or a memory card, and installed from the recording medium to the controller 40.

Next, the plating treatment using the plating treatment apparatus 1 configured as described above will be described.

Figure 2:
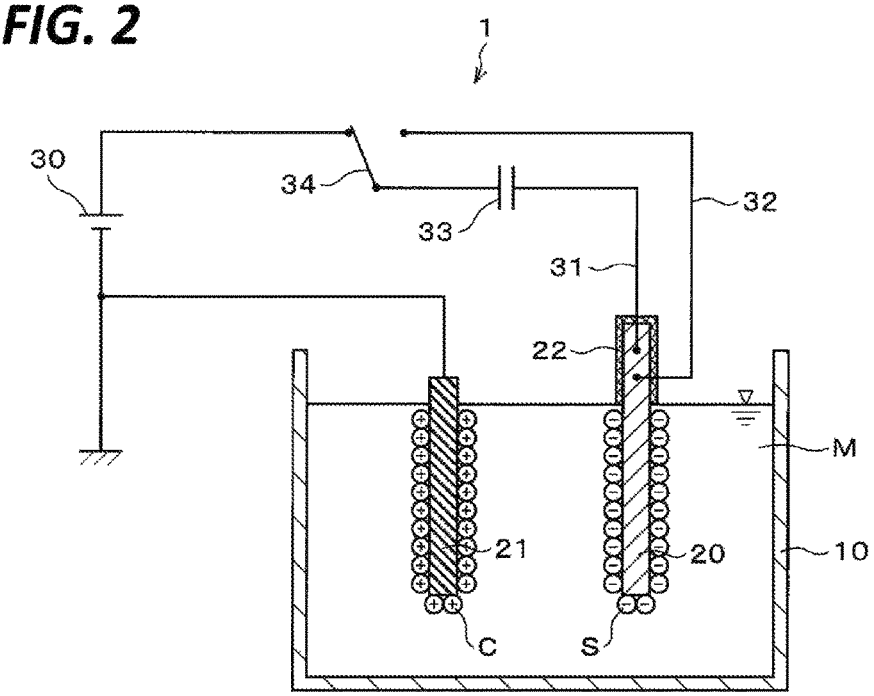
FIG. 2 is an explanatory view illustrating a charged state of a capacitor.

As illustrated in FIG. 2, the first wiring 31 and the DC power supply 30 are connected to each other by the switch 34. That is, the first wiring 31 and the second wiring 32 are not connected to each other. Then, the capacitor 33 is charged. That is, positive charges are accumulated at the common electrode 20 side of the capacitor 33, and negative charges are accumulated at the DC power supply 30 side of the capacitor 33. In addition, an electric field (electrostatic field) is formed in the plating liquid M. Then, positive charges are accumulated in the common electrode 20, and sulfate ions S as negatively charged particles are gathered to the common electrode 20 side. Meanwhile, negative charges are accumulated in the counter electrode 21, and copper ions C, which are positively charged particles, are moved to the counter electrode 21 side.

In order to avoid that the common electrode 20 becomes a cathode, the common electrode 20 is in an electrically floating state without being connected to the ground. In this circumstance, since a charge exchange does not occur on any of the surface of the common electrode 20 and the surface of the counter electrode 21, the charged particles attracted by the electrostatic field are arranged on the surfaces of the electrodes.

The connection between the first wiring 31 and the DC power supply 30 by the switch 34 is performed until the capacitor 33 is fully charged. Then, the copper ions C are uniformly arranged on the surface of the counter electrode 21. Since the charge exchange of the copper ions C does not occur on the surface of the counter electrode 21, and the electrolysis of water is also suppressed, the electric field when a voltage is applied between the common electrode 20 and the counter electrode 21 may be increased. In addition, the movement of the copper ions C may be made faster by the high electric field. Further, by arbitrarily controlling the electric field, the copper ions C arranged on the surface of the counter electrode 21 are also arbitrarily controlled.

Figure 3:
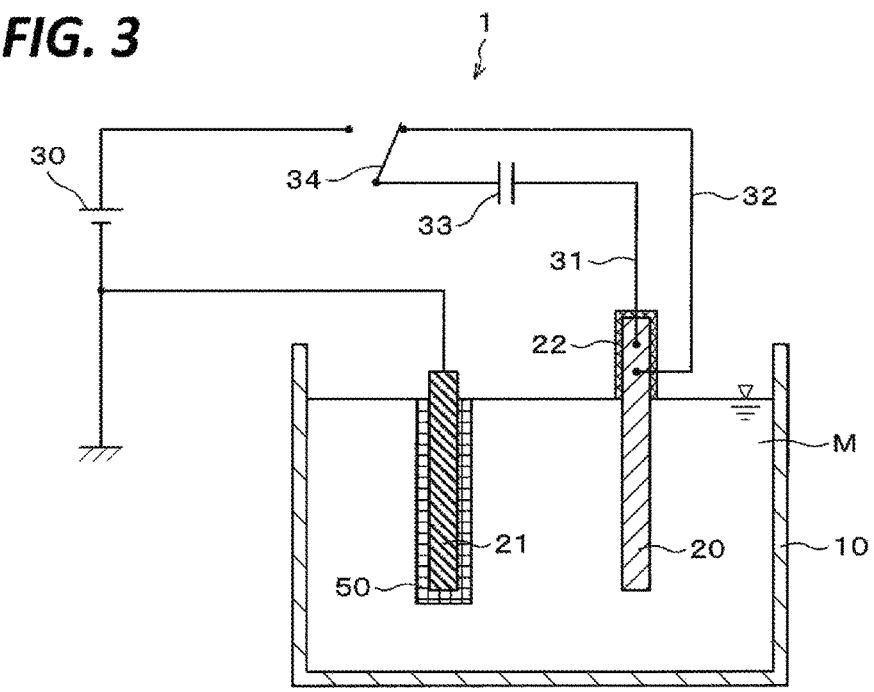
FIG. 3 is an explanatory view illustrating a discharged state of the capacitor.

Thereafter, as illustrated in FIG. 3, by switching the switch 34, the connection between the first wiring 31 and the DC power supply 30 is cut off and the first wiring 31 and the second wiring 32 are connected to each other. Then, the capacitor 33 is discharged, and the positive charges accumulated at the common electrode 20 side of the capacitor 33 are moved to the common electrode 20 so that the charges of the sulfate ions S gathered to the common electrode 20 side are exchanged, and the sulfate ions S are oxidized. Accordingly, the charges of the copper ions C arranged on the surface of the counter electrode 21 are exchanged, and the copper ions C are reduced. Then, a copper plating 50 is precipitated on the surface of the counter electrode 21.

Since sufficient copper ions C are integrated on the surface of the counter electrode 21 and reduced in the uniformly arranged state, the copper plating 50 may be uniformly precipitated on the surface of the counter electrode 21. As a result, the density of crystals in the copper plating 50 increases so that a good quality copper plating 50 may be formed. Further, since the reduction is performed in the state where the copper ions C are uniformly arranged on the surface of the counter electrode 21, a uniform and high quality copper plating 50 may be produced.

The above-described movement and integration of the copper ions C during the charging of the capacitor 33 and the above-described reduction of the copper ions C during the discharging of the capacitor 33 are repeatedly performed so that the copper plating 50 grows to have a predetermined film thickness. Then, a series of plating processes in the plating treatment apparatus 11 are ended.

According to the above-described exemplary embodiment, since the charging and discharging of the capacitor 33 are switched by the switch 34, the movement and reduction of the copper ions C are individually performed. In addition, the concentration of the copper ions C to be integrated on the counter electrode 21 side may be controlled by adjusting the capacity of the capacitor 33. For example, when the concentration of the copper ions C is controlled to be high, the reduction of the copper ions C may be performed in the state where sufficient copper ions C are integrated on the surface of the counter electrode 21, and as a result, the rate of the plating treatment may be improved.

Further, since the reduction of the copper ions C is performed in the state where the copper ions C are uniformly arranged on the surface of the counter electrode 21, the uniformity of the plating treatment may also be improved. Further, since the copper ions C are uniformly arranged, the crystals in the copper plating 50 may be densely arranged. Accordingly, the quality of the plated workpiece may be improved.

In addition, even when a pulse voltage is applied by using a pulse power supply rather than using the switch 34 and the DC power supply 30, the same operation effect as that in the present exemplary embodiment may be achieved.

Figure 4:
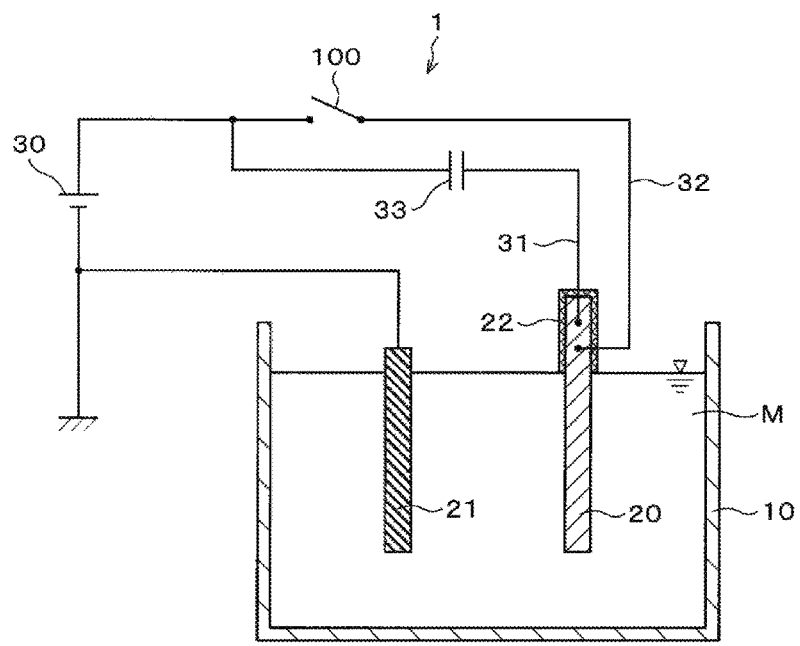
FIG. 4 is an explanatory view illustrating an outline of a plating treatment apparatus according to another exemplary embodiment.

Next, another exemplary embodiment of the plating treatment apparatus 1 will be described. Although the switch 34 is provided in the first wiring 31 in the plating treatment apparatus 1 illustrated in FIG. 1, the configuration of the switch is not limited thereto. For example, as illustrated in FIG. 4, a switch 100 may be provided in the second wiring 32. The ON/OFF of the switch 100 are controlled by the controller 40.

In the ON state of the switch 100, the common electrode 20 and the DC power supply 30 are connected to each other so that currents flow between the common electrode 20 and the counter electrode 21. In the OFF state of the switch 100, the common electrode 20 and the DC power supply 30 are disconnected so that no currents flow between the common electrode 20 and the counter electrode 30. The other components of the plating treatment apparatus 1 illustrated in FIG. 4 are identical to those of the plating treatment apparatus 1 illustrated in FIG. 1.

Figure 5:
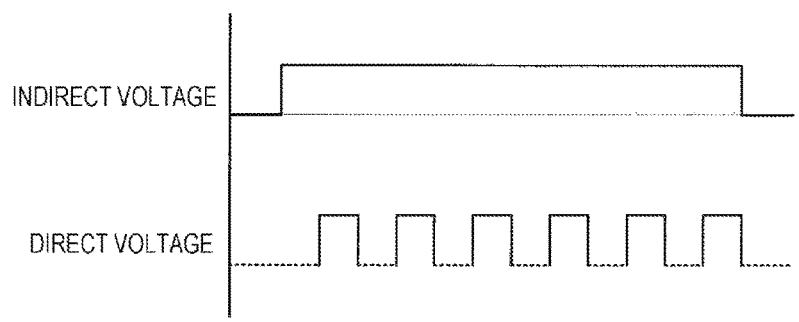
FIG. 5 is a graph illustrating applying a DC voltage in a pulse form between a common electrode and a counter electrode while continuously applying the DC voltage between the common electrode and the counter electrode.

In this case, as illustrated in FIG. 5, while a DC voltage (indirect voltage) is continuously applied between the common electrode 20 and the counter electrode 21 through the first wiring 31, a DC voltage in a pulse form, i.e., a so-called pulse voltage (direct voltage) is applied between the common electrode 20 and the counter electrode 21 through the second wiring 32.

Figure 6:
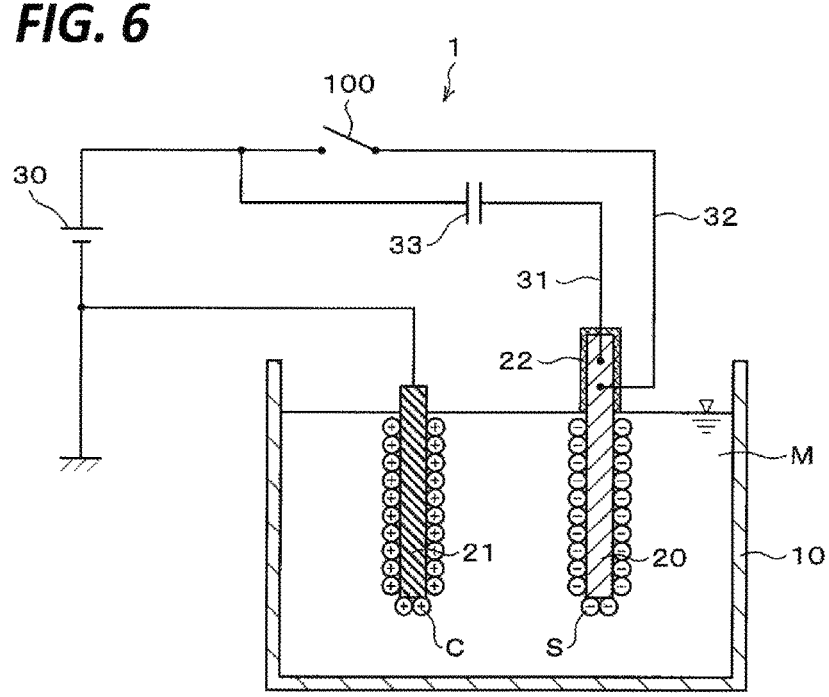
FIG. 6 is an explanatory view illustrating a charged state of a capacitor.

More specifically, as illustrated in FIG. 6, the DC voltage is continuously applied between the common electrode 20 and the counter electrode 21 through the first wiring 31 so that the capacitor 33 is charged. That is, positive charges are accumulated at the common electrode 20 side of the capacitor 33, and negative charges are accumulated at the DC power supply 30 side of the capacitor 33. Then, an electric field (electrostatic field) is formed in the plating liquid M. Then, positive charges are accumulated in the common electrode 20, and sulfate ions S as negatively charged particles are gathered to the common electrode 20 side. Meanwhile, negative charges are accumulated in the counter electrode 21, and copper ions C, which are positively charged particles, are moved to the counter electrode 21 side.

At this time, the common electrode 20 is kept in the electrically floating state by leaving the switch 100 in the OFF state. In this circumstance, since the charge exchange does not occur on any of the surface of the common electrode 20 and the surface of the counter electrode 21, the charged particles attracted by the electrostatic field are arranged on the surfaces of the electrodes. As illustrated in FIG. 6, the copper ions C are also uniformly arranged on the surface of the counter electrode 21 which is a workpiece. Since the charge exchange of the copper ions C does not occur on the surface of the counter electrode 21, and the electrolysis of water is also suppressed, the electric field when a voltage is applied between the common electrode 20 and the counter electrode 21 may be increased. In addition, the movement of the copper ions C may be made faster by the high electric field. Further, by arbitrarily controlling the electric field, the copper ions C arranged on the surface of the counter electrode 21 are also arbitrarily controlled.

In the present exemplary embodiment, in order to avoid that the common electrode 20 becomes a cathode, the common electrode 20 is in the electrically floating state without being connected to the ground.

Figure 7:
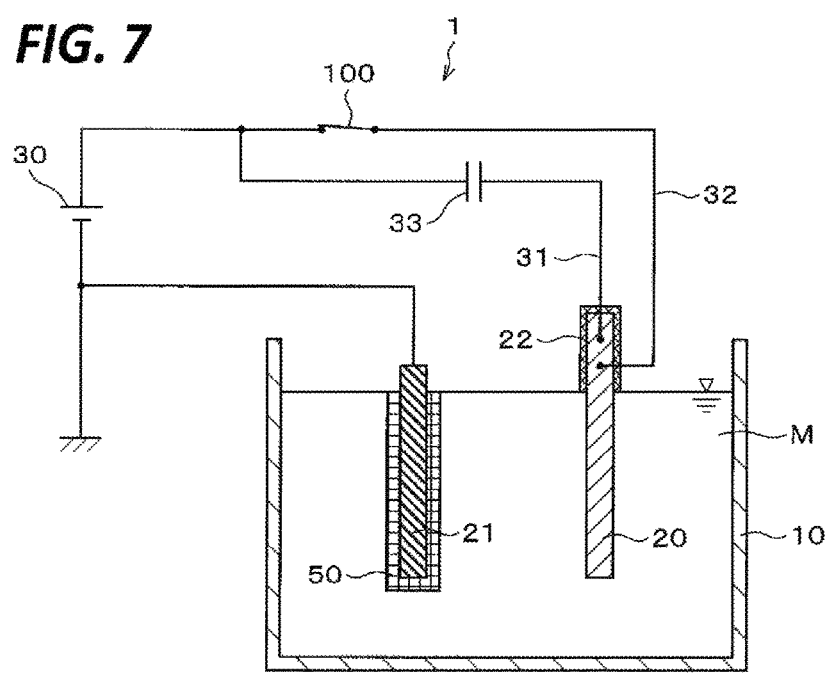
FIG. 7 is an explanatory view illustrating a discharged state of the capacitor.

Thereafter, when sufficient copper ions C are moved to the counter electrode 21 side to be integrated thereon, the switch 100 is turned ON as illustrated in FIG. 7. Then, a voltage is applied in a state where the common electrode 20 is an anode, and the counter electrode 21 is a cathode, by applying a DC voltage in a pulse form between the common electrode 20 and the counter electrode 21 through the second wiring 32 such that currents are caused to flow between the common electrode 20 and the counter electrode 21. The capacitor 33 is discharged, and the positive charges accumulated at the common electrode 20 side of the capacitor 33 are moved to the common electrode 20 so that the charges of the sulfate ions S gathered to the common electrode 20 side are exchanged, and the sulfate ions S are oxidized. Accordingly, the charges of the copper ions C arranged on the surface of the counter electrode 21 are exchanged, and the copper ions C are reduced. Then, a copper plating 50 is precipitated on the surface of the counter electrode 21.

Since the sufficient copper ions C are integrated on the surface of the counter electrode 21 and reduced in the uniformly arranged state, the copper plating 50 may be uniformly precipitated on the surface of the counter electrode 21. As a result, the density of crystals in the copper plating 50 increases so that a good quality copper plating 50 may be formed. Further, since the reduction is performed in the state where the copper ions C are uniformly arranged on the surface of the counter electrode 21, a uniform and high quality copper plating 50 may be produced.

Then, the above-described movement and integration of the copper ions C during the charging of the capacitor 33 and the reduction of the copper ions C during the discharging of the capacitor 33 are repeatedly performed so that the copper plating 50 grows to have a predetermined film thickness. Then, a series of plating processes in the plating treatment apparatus 11 are ended.

In the present exemplary embodiment as well, the same effect as that in the above-described exemplary embodiment may be achieved. That is, the rate of the plating treatment may be improved, and the uniformity of the plating treatment is improved so that the quality of the plated workpiece may be improved.

Figure 8:
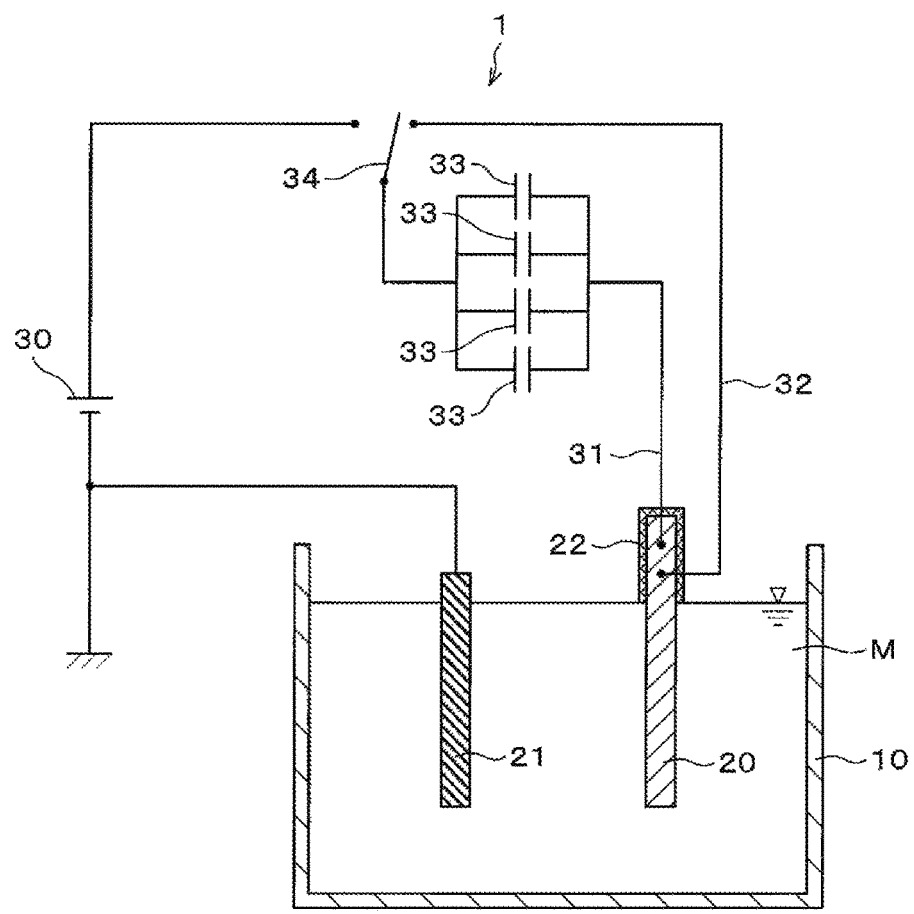
FIG. 8 is an explanatory view illustrating an outline of a plating treatment apparatus according to another exemplary embodiment.

Next, another exemplary embodiment of the plating treatment apparatus 1 will be described. As illustrated in FIG. 8, a plurality of capacitors 33 may be provided in parallel in the first wiring 31. In addition, the number of the capacitors 33 may be arbitrarily set. Since the capacitors 33 may not be in contact with the plating liquid M and may be disposed at an arbitrary position, the degree of freedom in setting the size or number of the capacitors 33 is high.

In this case, the capacities of the capacitors 33 may be made large. Then, the concentration of the copper ions C to be integrated on the surface of the counter electrode 21 may be controlled to be high. When the concentration of the copper ions C is controlled to be high, the charge exchange of the copper ions C may be performed in a state where sufficient copper ions C are integrated on the surface of the counter electrode 21, and as a result, the rate of the plating treatment may be improved. Further, since the charge exchange of the copper ions C is performed in the state where the copper ions C are uniformly arranged on the surface of the counter electrode 21, the uniformity of the plating treatment may also be improved.

In the present exemplary embodiment as well, instead of the switch 34, the switch 100 illustrated in FIG. 4 may be used.

In the above-described exemplary embodiments, descriptions have been made with reference to the case where the plating treatment is performed as the electrolytic treatment. However, the present disclosure may be applied to various electrolytic treatments such as, for example, an etching treatment.

In the above-described exemplary embodiments, descriptions have been made with reference to the case where the copper ions C on the counter electrode 21 side are reduced. However, the present disclosure may also be applied to a case where the treatment target ions on the counter electrode 21 side are oxidized. In this case, the treatment target ions are anions, and the same electrolytic treatment may be performed reversing the anodes and the cathodes in the above-described exemplary embodiments. In this exemplary embodiment as well, the same effect as that in the above-described exemplary embodiments may be achieved though the difference exists in the oxidization and the reduction of the treatment target ions.

Various exemplary embodiments of the present disclosure have been described with reference to the accompanying drawings, but the present disclosure is not limited to the exemplary embodiments. It is obvious that a person skilled in the art is able to conceive various changes or modifications within the scope of the technical idea defined in the claims. Accordingly, it is understood that the changes or modifications also belong to the technical scope of the present disclosure. The present disclosure is not limited to the exemplary embodiments, and various aspects may be adopted.

EXAMPLES

Hereinafter, examples of the present disclosure will be described. In the examples, experiments were conducted using the plating treatment apparatus 1 illustrated in FIG. 1, and the plating treatment was evaluated. In the experiments, a copper sulfate in which a copper concentration is 250 g/L was used as the plating liquid M. The discharge time of the capacitor 33 was 10 μs, and the discharge period of the capacitor 33 was 500 μs. Further, a variation of a voltage was measured by changing the capacity of the capacitor 33 to 470 pF, 220 pF, and 110 pF. Specifically, a voltage was measured by providing a resistance of 10 kΩ between the DC power supply 30 and the counter electrode 21. A plating precipitation amount was also measured by changing the capacity of the capacitor 33 as described above.

Figure 9A:
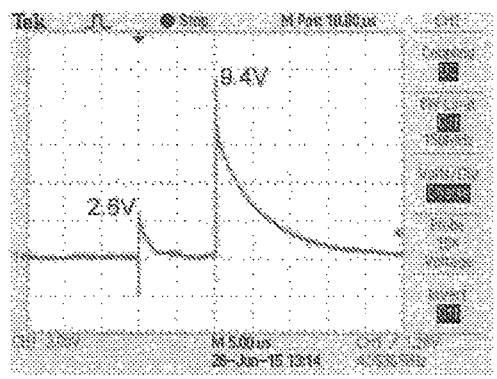
FIGS. 9A to 9C are graphs each illustrating a variation of a voltage applied in an example.
Figure 9B:
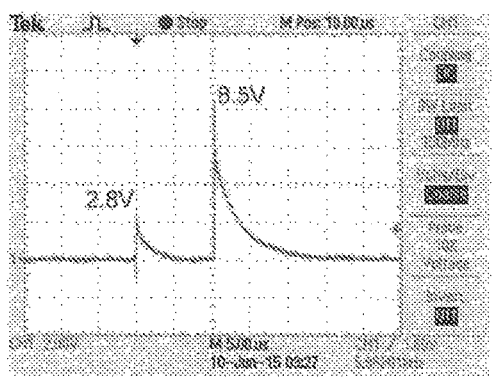
Figure 9C:
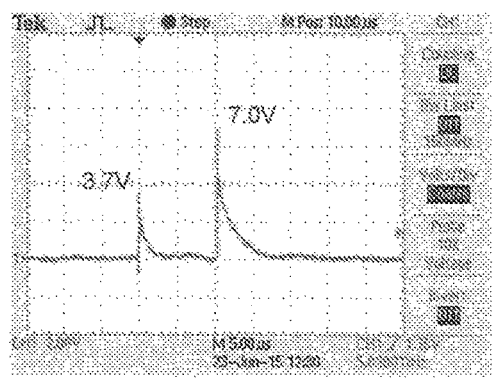

FIGS. 9A to 9C are graphs each illustrating a variation of the voltage to be applied, as a result of the experiments. The vertical axis represents a voltage, and the horizontal axis represents time. FIG. 9A represents a variation of the voltage when the capacity of the capacitor 33 is 470 pF, FIG. 9B represents a variation of the voltage when the capacity of the capacitor 33 is 220 pF, and FIG. 9C represents a variation of the voltage when the capacity of the capacitor 33 is 110 pF.

Referring to FIGS. 9A to 9C, it has been found that when the capacity of the capacitor 33 increases, the voltage to be applied increases at the time of initiating the charging of the capacitor 33. Since the discharging of the capacitor 33 relies on a capacity time constant, it has been found that as the capacity of the capacitor 33 increases, time required for the capacitor 33 to be thoroughly discharged increases.

Figure 10:
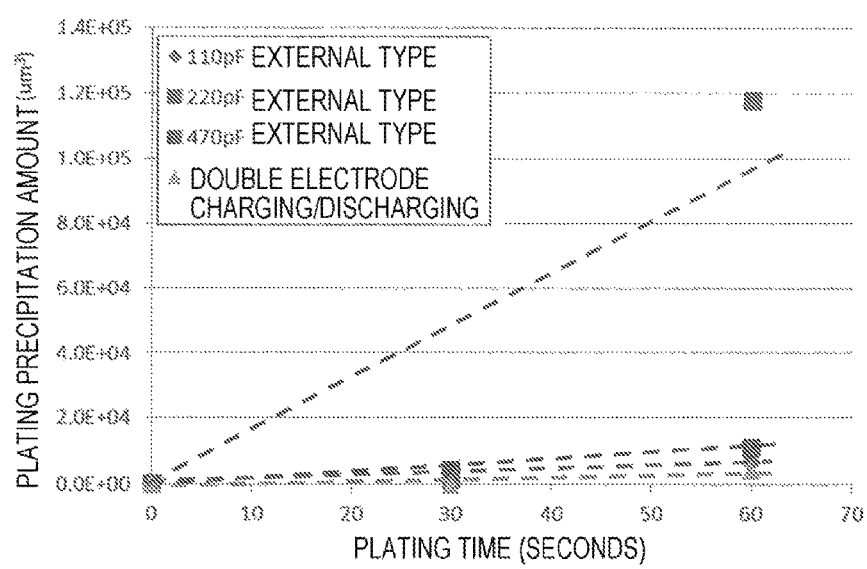
FIG. 10 is a graph illustrating a plating precipitation amount in an example.

FIG. 10 is a graph illustrating a plating precipitation amount, as a result of the experiments. The vertical axis represents a plating precipitation amount, and the horizontal axis represents plating time. FIG. 10 represents a plating precipitation amount in a case where the capacity of the capacitor 33 is changed to 470 pF, 220 pF, and 110 pF (a 470 pF external type, a 220 pF external type, and a 110 pF external type). Further, an experiment was conducted using the conventional plating treatment apparatus (double electrodes) disclosed in Japanese Laid-Open Patent Publication No. 2015-004124 as illustrated in FIG. 7, and FIG. 10 also represents a plating precipitation amount obtained as a result of the experiment. In addition, the effective capacity of the conventional double electrodes is estimated to be 50 pF.

Referring to FIG. 10, it has been found that when the plating treatment apparatus of the present disclosure is used, the precipitation rate of the copper plating 50 increases so that the precipitation amount increases, as compared to the case where the conventional plating treatment apparatus disclosed in Japanese Laid-Open Patent Publication No. 2015-004124 is used. In addition, it has been found that in the present disclosure as well, when the capacity of the capacitor 33 increases, the precipitation rate of the copper plating 50 increases so that the precipitation amount increases.

Accordingly, it has been found that even in the configuration where the capacitor 33 is provided in the plating treatment apparatus 1 as in the present disclosure, the same effect may be obtained as that obtained by calculating the equivalent circuit, and the rate of the plating treatment may be improved. Further, the capacity of the capacitor 33 is required to be optimized by a capacity time constant of discharging.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An electrolytic treatment apparatus for performing a predetermined treatment by using treatment target ions contained in a treatment liquid, the apparatus comprising:
   a common electrode and a counter electrode that are disposed such that the treatment liquid is interposed therebetween,
   wherein a first wiring and a second wiring are both directly connected to the common electrode, and a capacitor, positioned outside the treatment liquid, is provided along the first wiring and is constantly connected to the common electrode,
   when charging of the capacitor is performed in a state where the first wiring and the second wiring are not connected to each other, the common electrode forms an electric field in the treatment liquid so that the treatment target ions in the treatment liquid are moved to the counter electrode side, and
   when discharging of the capacitor is performed in a state where the first wiring and the second wiring are connected to each other, a voltage is applied between the common electrode and the counter electrode so that the treatment target ions moved to the counter electrode side are oxidized or reduced.

2. The electrolytic treatment apparatus of claim 1, further comprising:
   a switch configured to switch a connection or a disconnection between the first wiring and the second wiring.

3. The electrolytic treatment apparatus of claim 1, wherein in the first wiring, a plurality of capacitors is provided in parallel.

4. An electrolytic treatment method for performing a predetermined treatment by using treatment target ions included in a treatment liquid, the method comprising:
   a first process of disposing a common electrode and a counter electrode such that the treatment liquid is interposed therebetween, connecting a first wiring and a second wiring to the common electrode, and providing a capacitor in the first wiring;
   a second process of performing charging of the capacitor without connecting the first wiring and the second wiring to each other to form an electric field in the treatment liquid such that the treatment target ions in the treatment liquid are moved to the counter electrode side; and
   a third process of performing discharging of the capacitor in a state where the first wiring and the second wiring are connected to each other to apply a voltage between the common electrode and the counter electrode such that the treatment target ions moved to the counter electrode side are oxidized or reduced.

5. The electrolytic treatment method of claim 4, wherein a disconnection between the first wiring and the second wiring in the second process and a connection between the first wiring and the second wiring in the third process are performed by a switch.

6. The electrolytic treatment apparatus of claim 4, wherein in the first process, a plurality of capacitors is provided in parallel in the first wiring.

7. The electrolytic treatment apparatus of claim 4, wherein in the first process, the capacitor is provided outside the treatment liquid.

8. The electrolytic treatment apparatus of claim 1, wherein the counter electrode is connected to a negative side of a power supply.

9. The electrolytic treatment apparatus of claim 1, wherein a portion of the common electrode is exposed to the atmosphere.

10. The electrolytic treatment apparatus of claim 9, wherein the exposed portion of the common electrode is coated with an insulating material.

* * * * *